3,265,585
PRODUCTION OF 5'-INOSINIC ACID BY FERMENTATION

Takashi Nara, Tokyo, Masanaru Misawa, Kawasaki-shi, Shigeo Abe, Tokyo, and Kiyoshi Udagawa, Yokohama, Japan, assignors to Kyowa Hakko Kogyo Co., Ltd., Tokyo, Japan, a corporation of Japan
No Drawing. Filed Nov. 14, 1963, Ser. No. 323,597
Claims priority, application Japan, Nov. 29, 1962, 37/52,529
5 Claims. (Cl. 195—28)

This invention relates to a method of producing 5'-inosinic acid by a fermentation process. An essential feature of the invention is the culturing of an adenine-requiring mutant (auxotroph) of *Brevibacterium ammoniagenes* in a suitable culture medium.

The microorganisms employed in the process of this invention are adenine-requiring mutants obtained by treating *Brevibacterium ammoniagenes*, e.g. ATCC 6871 and ATCC 6872, in per se conventional manner with one or more mutagenic agents, such as $Co_{60}$, X-ray and gamma ray. Strains which require, in addition to adenine, one or more other growth factors, e.g. biotin, xanthine, etc. are also useful according to this invention. Thus, every auxotroph of *Brevibacterium ammoniagenes* which requires adenine for its growth, whether or not it also requires one or more further growth factors, is suitable for use in the process of this invention.

The culture medium according to this invention is an aqueous nutrient medium containing the required growth factors per se or material containing same, carbon source, nitrogen source and minerals.

Adenine is always among the required growth factors. It can be used as such, provided by one of its sources, e.g. yeast extract, fish meal and ribonucleic acid, or a combination of adenine and/or one or more of its sources can be employed.

As a carbon source a carbohydrate, e.g. glucose, may be employed or any other carbon source the microorganism can metabolize, e.g. starch hydrolyzates and glutamic acid. The nitrogen source may be in the form of either an organic compound, e.g. urea, or an inorganic compound, e.g. ammonium chloride, as long as the nitrogen is in a form available to the microorganism. Exemplary minerals are potassium phosphate, magnesium sulfate and calcium chloride.

The fermentation may be conducted under aerobic conditions, for example, by shaking culture or by submerged culture with aeration and agitation at temperatures in the range from 20° to 40° C. If desired, the pH of aqueous media may be controlled with neutralizing agents, such as aqueous ammonia, aqueous sodium hydroxide and urea (capable of being decomposed into $NH_3$ and $CO_2$ by urease in cultures).

Unexpectedly large yields of 5'-inosinic acid, sometimes together with a relatively small amount of hypoxanthine, accumulate in the aqueous media, as well as in cells, usually within a period from 2 to 8 days of fermentation.

At the end of fermentation, inosinic acid is recovered by ion-exchange means, as hereinafter described in Example 1 or by similar processes employing other known ion-exchangers, or other known recovery processes, such as extraction, adsorption and precipitation.

The following specific examples of the present invention are illustrative only and should not be construed as limiting the present invention. All percentages are by weight based on the total weight of medium unless otherwise stated. Temperatures are in degrees centigrade.

Example 1

Sterilize an aqueous nutrient medium consisting

| Ingredient: | Amount |
|---|---|
| Glucose | 2%. |
| Peptone | 1%. |
| Beef extract (adenine-containing) | 1%. |
| Sodium chloride (NaCl) | 0.3%. |
| Biotin | 20 micrograms/liter (mcg./l.). |
| Water (distilled) | Remainder. | and having its pH adjusted to 7.2 by means of 5 N-NaOH prior to sterilization. Distribute a 30 milliliter (ml.) portion of the sterilized aqueous nutrient medium into each of a number of 500 ml. Erlenmeyer flasks. Inoculate the medium in each of said Erlenmeyer flasks with a culture of *Brevibacterium ammoniagenes* No. 7208; ATCC No. 15187 (an adenine-requiring mutant of *Brevibacterium ammoniagenes* ATCC No. 6872). Shake-culture the inoculated media on a shaking machine at a temperature of 30° for 24 hours.

Transfer the resulting inoculum culture into a sterilized aqueous fermentation medium in a proportion of 10 percent by volume.

The aqueous fermentation medium consists of

| Ingredient: | Amount, grams (g.) |
|---|---|
| Glucose | 70 |
| $NH_4Cl$ | 13 |
| $KH_2PO_4$ | 10 |
| $K_2HPO_4$ | 10 |
| $MgSO_4 \cdot 7H_2O$ | 0.4 |
| Corn steep liquor (adenine-containing) | 6 |
| Water (distilled) to make up 1 liter total volume. | | and having its pH adjusted to 7.2 prior to sterilization.

Distribute a 30 ml. portion of the sterilized aqueous fermentation medium to which 10 percent by volume of inoculum culture has been added into each of a number of 500 ml. Erlenmeyer flasks. Sterilize the content of each of said flasks. Thereafter add to the content of each flask 10 g. of $CaCO_3$ which has been separately sterilized. Shake-culture the resulting media on a shaking machine at a temperature of 30° for 96 hours.

Following the preceding procedure, 9.8 milligrams/milliliter (mg./ml.) of 5'-inosinic acid is accumulated in the aqueous phase of the culture broth, a noticeable amount is concurrently accumulated in the cells.

Filter the culture broth. Adjust the pH of the filtrate to 1.4 with HCl. Pass the thus-treated filtrate through a column of sulfonated polystyrene type cation exchange resin (H form). Immediately after the filtrate sinks below the surface of the column, introduce distilled water into the column. Combine the filtrate with those fractions which follow and which also contain inosinic acid. Adjust the pH of the combined fractions to 7.2 with sodium hydroxide. Concentrate the adjusted fractions in vacuo at about 50 mm. Hg and about 30° C. and cool the concentrated product to about 0–2° C. By this process a yield of 5.2 g. of crystalline sodium 5'-inosinate is obtained.

The cation exchange resin may be any of the commercially available products such e.g. as Diaion SK No. 1, (Mitsubishi Kasei Kogyo Co.) or Amberlite IR-120 (Rohm & Haas) (see U.S. Pat. No. 2,366,007 for method of preparation).

Example 2

Sterilize an aqueous fermentation medium consisting of

| Ingredient: | Amount |
|---|---|
| Glucose, percent | 10 |
| $(NH_4)_2SO_4$, percent | 0.3 |
| $KH_2PO_4$, percent | 0.3 |
| $K_2HPO_4$, percent | 0.2 |
| $MgSO_4 \cdot 7H_2O$, percent | 0.025 |
| NZ-amine, percent | 0.6 |
| Corn steep liquor (adenine-containing) percent | 0.6 |
| Adenine, mg./l. | 4 |
| Water (distilled) | Remainder | and having its pH adjusted to 7.2 prior to sterilization. Transfer inoculum culture (as prepared in Example 1) into the sterilized aqueous fermentation medium in a proportion of 10 percent by vloume.

Distribute a 30 ml. portion of the combined medium into each of a number of 500 ml. Erlenmeyer flasks. Sterilize the content of each of said flasks. Thereafter add to the content of each of said flasks 10 g. of separately sterilized $CaCO_3$. Shake-culture the resulting media on a shaking machine at a temperature of 30° for 103 hours, maintaining the pH thereof at about 7.2 by the intermittent addition thereto of urea.

Following this procedure 8.5 mg./ml. of inosinic acid and 0.2 mg./ml. of hypoxanthine accumalate in the media.

Example 3

Inoculate 30 ml. portions of sterilized aqueous nutrient medium (as prepared in Example 1 and additionally containing 10 mg./liter of xanthine) in separate 500 ml. Erlenmeyer flasks with *Brevibacterium ammoniagenes* No. 7244; ATCC No. 15188 (an adenine and xanthine requiring mutant of *Brevibacterium ammoniagenes* ATCC 6872). Shake-culture the inoculated medium on a shaking machine at a temperature of 30° for 24 hours. Transfer the resulting inoculum culture into sterilized aqeous fermentation medium (as prepared in Example 2) in a proportion of 10 percent by volume to obtain a combined medium.

Distribute a 30 ml. portion of the combined medium into each of a number of 500 ml. Erlenmeyer flasks. Sterilize the content of each of said flasks. Thereafter add to the content of each of said flasks 10 g. of separately sterilized $CaCO_3$. Shake-culture the resulting media on a shaking machine at a temperature of 30° for 96 hours, maintaining the pH thereof at about 7.2 by intermittent addition of urea thereto.

Following this procedure 10.2 mg./ml. of 5'-inosinic acid and 0.8 mg./ml. of hypoxanthine accumulate in the media.

Example 4

Inoculate 30 ml. portions of sterilized aqueous nutient medium (as prepared in Example 1) in separate 500 ml. Erlenmeyer flasks with *Brevibacterium ammoniagenes* No. 7339; ATCC No. 15189 (an adenine-requiring mutant of *Br. ammoniagenes* ATCC No. 6871). Shake-culture the inoculated medium on a shaking machine at a temperature of 30° for 24 hours. Transfer the resulting inoculum culture into sterilized aqueous fermentation medium in a proportion of 10 percent by volume to obtain a combined medium.

The fermentation medium consists of

| Ingredient: | Amount |
|---|---|
| Glucose, percent | 10 |
| $(NH_4)_2SO_4$, percent | 0.3 |
| $KH_2PO_4$, percent | 0.3 |
| $K_2HPO_4$, percent | 0.3 |
| Corn steep liquor (adenine-containing) percent | 0.5 |
| NZ-amine, percent | 0.5 |
| Adenine, mg./l. | 10 |
| Water (distilled) | Remainder | having its pH adjusted to 7.0 prior to sterilization.

Distribute a 30 ml. portion of the combined medium into each of a number of 500 ml. Erlenmeyer flasks. Sterilize the content of each of said flasks. Thereafter add to the content of each of said flasks separately sterilized $CaCO_3$. Shake-culture the resulting media on a shaking machine at a temperature of 30° for 120 hours, maintaining the pH thereof at about 7.0 by the intermittent addition thereto of urea.

Following this procedure 11.5 mg./ml. of 5'-inosinic acid accumulate in the media.

Example 6

Inoculate 30 ml. portions of sterilized aqueous nutrient medium (as prepared in Example 1) in separate 500 ml. Erlenmeyer flasks with *Brevibacterium ammoniagenes* No. 7320; ATCC No. 15190 (an adenine-requiring mutant of *Brevibacterium ammoniagenes* ATCC 6871). Shake-culture the inoculated medium on a shaking machine at a temperature of 30° for 24 hours. Transfer the resulting inoculum culture into sterilized aqueous fermentation medium (as prepared in Example 1) in a proportion of 10 percent by volume to obtain a combined medium.

Distribute a 30 ml. portion of the combined medium into each of a number of 500 ml. Erlenmeyer flasks. Sterilize the content of each of said flasks. Thereafter add to the sterilized content of each flask 10 g. of separately sterilized $CaCO_3$. Shake-culture the resulting media on a shaking machine at a temperature of 30° for 103 hours.

Following this procedure 5.3 mg./ml. of 5'-inosinic acid and 0.4 mg./ml. of hypoxanthine accumulate in the media.

Example 6

Inoculate 30 ml. portions of sterilized nutrient medium (as prepared in Example 1) in separate 500 ml. Erlenmeyer flasks with *Brevibacterium ammoniagenes* No. 7320; ATCC No. 15190 (an adenine-requiring mutant of *Brevibacterium ammoniagenes* ATCC 6871). Shake-culture of the inoculated medium on a shaking machine at a temperature of 30° for 24 hours. Thransfer the resulting inoculum culture into sterilized aqueous fermentation medium in a proportion of 10 percent by volume to obtain a combined medium.

The fermentation medium consists of

| Ingredient: | Amount |
|---|---|
| Glucose, percent | 10 |
| Urea, percent | 0.6 |
| $K_2HPO_4$, percent | 0.7 |
| $KH_2PO_4$, percent | 0.7 |
| $MgSO_4 \cdot 7H_2O$, percent | 0.6 |
| Biotin, mcg./l. | 20 |
| $CaCl_2 \cdot 2H_2O$, percent | 0.1 |
| Yeast extract, percent | 0.5 |
| Water (distilled) | Remainder | having its pH adjusted to 7.8 before sterilization.

Distribute a 30 ml. portion of the combined medium into each of a number of 500 ml. Erlenmeyer flasks. Sterilize the content of each of said flasks. Thereafter add to the sterilized content of each flask 10 g. of separately sterilized $CaCO_3$. Shake-culture the resulting media on a shaking machine at a temperature of 30° for 96 hours.

Following this procedure 6.2 mg./ml. of 5'-inosinic acid and 0.3 mg./ml. of hypoxanthine accumulate in the media.

The present invention and its advantages will be understood from the foregoing description. It is apparent that various minor changes can be made in the process and in the microorganisms without departing from the spirit and scope of the invention or sacrificing its material advantages.

What is claimed is:

1. A fermentative method of producing 5'-inosinic acid which comprises culturing an adenine-requiring auxotroph of *Brevibacterium ammoniagenes* in an aqueous nutrient medium therefor containing adenine, whereby 5'-inosinic acid is accumulated both in the medium and in cells, and recovering the thus-accumulated 5'-inosinic acid.

2. A fermentative method of producing 5'-inosinic acid which comprises culturing *Brevibacterium ammoniagenes* No. 7208, ATCC No. 15187, in an aqueous nutrient medium containing adenine, whereby 5'-inosinic acid is accumulated both in the medium and in cells, and recovering the thus-accumulated 5'-inosinic acid.

3. A fermentative method of producing 5'-inosinic acid which comprises culturing *Brevibacterium ammoniagenes* No. 7244, ATCC No. 15188, in an aqueous nutrient medium containing adenine and xanthine, whereby 5'-inosinic acid is accumulated both in the medium and in cells, and recovering the thus-accumulated 5'-inosinic acid.

4. A fermentative method of producing inosinic acid which comprises culturing *Brevibacterium ammoniagenes* No. 7339, ATCC No. 15189, in an aqueous nutrient medium containing adenine, whereby 5'-inosinic acid is accumulated both in the medium and in cells, and recovering the thus-accumulated 5'-inosinic acid.

5. A fermentative method of producing 5'-inosinic acid which comprises culturing *Brevibacterium ammoniagenes* No. 7320, ATCC No. 15190, in an aqueous nutrient medium containing adenine, whereby inosinic acid is accumulated both in the medium and in cells, and recovering the thus-accumulated 5'-inosinic acid.

References Cited by the Examiner
UNITED STATES PATENTS

| | | | |
|---|---|---|---|
| 3,118,820 | 1/1964 | Uchida et al. | 195—28 |
| 3,135,666 | 6/1964 | Hara et al. | 195—28 |
| 3,152,966 | 10/1964 | Kinowshita et al. | 195—28 |

A. LOUIS MONACELL, *Primary Examiner.*

ALVIN E. TANENHOLTZ, *Examiner.*